J. Reakirt.
Putting up Caustic Alkalies.

Nº 86,319.        Patented Jan. 26, 1869.

Witnesses:
Edwin James
C. F. Gordon

Inventor:
John Reakirt
per J. E. F. Holmead
Attorney

United States Patent Office.

JOHN REAKIRT, OF PHILADELPHIA, PENNSYLVANIA, ASSIGNOR TO HIMSELF, DANIEL PHREANER, AND TRYON REAKIRT, OF SAME PLACE.

Letters Patent No. 86,319, dated January 26, 1869.

IMPROVEMENT IN PUTTING UP CAUSTIC ALKALIES.

The Schedule referred to in these Letters Patent and making part of the same.

*To all whom it may concern:*

Be it known that I, JOHN REAKIRT, of Philadelphia, in the county of Philadelphia, and State of Pennsylvania, have invented certain new and useful Improvements in Putting up Caustic Alkali; and I do hereby declare that the following is a full, clear, and exact description of the same, reference being had to the accompanying drawing, and to the letters of reference marked thereon, making part of this specification, in which—

Figure 5:
Figure 5 represents a tin or other metallic disk or cover coated with cement.

On July 7, 1868, Letters Patent of the United States were issued to me, numbered 79,599, for an improvement in putting up caustic alkalies.

The invention embraced in and covered by said Letters Patent, consisted in pouring the alkali, in a molten state, into an integument or jar formed of stone or earthenware, said jar being constructed with a shoulder or flange on its inner surface, and near its upper edge, on which rests the disk or cover.

The disk or cover, I constructed of the same material as the jar, its diameter being a little less than the mouth of the vessel, and its thickness also less than the space between the upper surface of the interior flange or shoulder and the upper ridge of the jar, the object of which was to insure the proper and secure sealing of the disk after the jar had been filled and the disk placed in position.

Thus it will be seen that the disk became perfectly embedded in the cement, its under side being coated before being placed in position, and the plastic cement being poured on the same, filled the space between its circumference and the interior of the jar, and covering its surface to a depth that left it flush with the edge of the mouth of the jar.

The cement used, and which constituted no insignificant feature of my invention, was composed of beeswax, rosin, German Burgundy pitch, and powdered brick.

Practical experience has fully attested the value of my invention.

The soda, lye, or other caustic alkali, can safely be packed and transported.

The jars have been found perfectly impervious to the deleterious effects of atmospheric contact, and the cement entirely infusible at the degree of heat to which, owing to the peculiar chemical properties of the alkalies, it is necessarily subjected.

My present invention is an improvement on my patent of July 7, 1868, and hereinbefore referred to.

I have found that when the alkali is intended for home consumption, and in all probability will be used in the course of a few weeks, it can safely be packed in an ordinary biscuited jar, i. e., a jar altogether unglazed; and again, that when the alkalies are unusually strong, and are intended for shipment at a great distance, the glazing may advantageously be applied to the entire surface, both inside and out.

I have also discovered that a thin disk or cover of tin, or other metal, pasteboard, or wood, when coated with my cement, is equally as effective as the material used in my former patent, and as I was the first to discover that caustic alkalies can safely be packed in earthenware or stone jars, and was also the first to introduce the same as a new article of manufacture, I believe I am fully entitled to and desire to be protected in the use of the jar, whether biscuited, glazed, as in my former patent, or when the glazing is applied to the entire inner and outer surface, and also to the different materials stated as suitable for the construction of the disk or cover, when the same is used in connection with the cement alluded to.

To enable others skilled in the art to make and use my invention, I will now proceed to describe its construction and operation.

A is a jar or case, and may be made of stone or earthenware, and provided with a shoulder or flange, $a$.

This jar may be circular, square, or of any other desired form.

Figure 1:
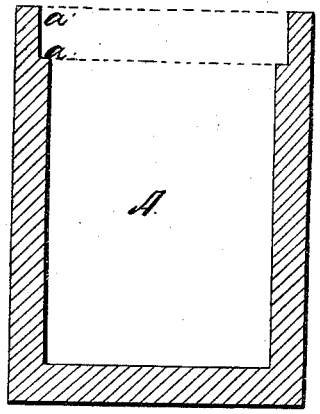
Figure 1 represents a sectional view of a biscuited jar, i. e., altogether unglazed.
Figure 2:
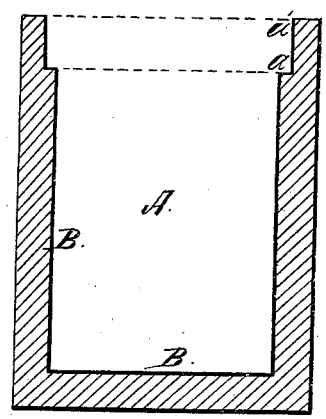
Figure 2 represents a sectional view of a jar glazed on the inside only.
Figure 3:
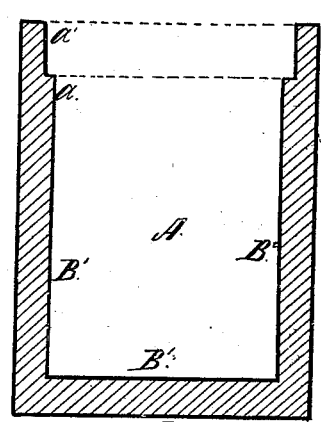
Figure 3 represents a sectional view of a jar glazed both on its inner and outer surfaces.

It may be an ordinary biscuited jar, as shown in fig. 1, its interior surface glazed, as shown at B, fig. 2, or with its entire surface glazed, both the interior and exterior, as shown at $B^1$ $B^2$, fig. 3.

Figure 6:
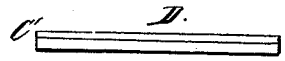
Figure 6 represents the disk or cover when constructed of pasteboard.
Figure 7:
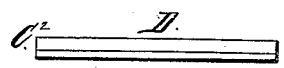
Figure 7 represents the disk or cover when constructed of wood.

The disk, plate, or cover may be constructed of tin or other metal, as shown at C, fig. 5; of pasteboard, as shown at $C^1$, fig. 6; or of wood, as shown at $C^2$, fig. 7.

The diameter of the disk D is a little less than that of the mouth of the jar or case A, and its thickness less than the distance between the shoulder or flange $a$ and the upper surface of the jar or case $a'$ $a'$.

The jar and inner surface of the disk are glazed by any of the well-known processes now used by potters, and other manufacturers of earthen and stone-ware.

The alkali, in a molten state, is poured into the jar or case A, until the same is filled to the height of the shoulder or flange $a$, or, if preferred, the alkali may be poured into moulds, and allowed to cool, and the blocks thus formed, placed in the jar or case.

Figure 4:
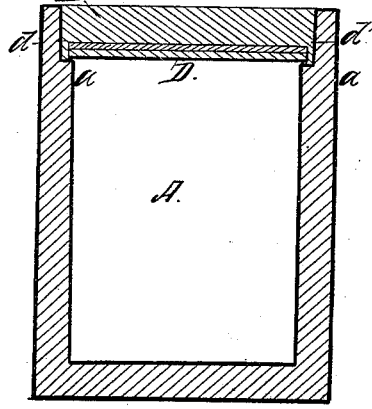
Figure 4 represents a sectional view of a jar with the cover or disk in position and securely cemented.

After the jar has been thus filled, the disk D is placed on the shoulders $a$ $a$, and the cement, composed of beeswax, rosin, German Burgundy pitch, and powdered brick, in a plastic state, is poured on the disk, running down and filling the entire space between the circumference of the disk, and the interior of the jar, as shown at $d\ d$, fig. 4, and also covering the entire upper surface of the disk and the space between its upper surface and the edge $a'\ a'$ of the jar. Thus the disk is entirely encased or embedded in the cement D', and all air and moisture effectually excluded.

The alkalies thus placed can be preserved in their original purity for any desired period.

Having thus fully described my invention,

What I claim therein as new, and desire to secure by Letters Patent of the United States, is—

1. Packing caustic alkali in a biscuited or glazed earthen or stone-ware jar, A, when said jar is provided with a shoulder or flange, $a$, so arranged as to receive the disk D, when the whole is hermetically sealed with the cement hereinbefore named, substantially as described, as and for the purpose specified.

2. Using in connection with a jar or case, constructed as shown, a disk or cover, D, having its under face glazed, when the same is composed of tin, pasteboard, or wood, and is used in connection with the cement D', substantially as described, as and for the purpose specified.

In testimony whereof, I have signed my name to this specification, in the presence of two subscribing witnesses.

JOHN REAKIRT.

Witnesses:
　WILSON KERR,
　JOHN DALY.